United States Patent
Chiang et al.

(10) Patent No.: US 10,411,310 B2
(45) Date of Patent: Sep. 10, 2019

(54) METHODS FOR ELECTROCHEMICAL CELL REMEDIATION

(71) Applicant: 24M Technologies, Inc., Cambridge, MA (US)

(72) Inventors: Yet-Ming Chiang, Weston, MA (US); William Woodford, Cambridge, MA (US); Hiuling Zoe Yu, Quincy, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 15/186,928

(22) Filed: Jun. 20, 2016

(65) Prior Publication Data

US 2016/0372802 A1 Dec. 22, 2016

Related U.S. Application Data

(60) Provisional application No. 62/182,241, filed on Jun. 19, 2015.

(51) Int. Cl.
*H01M 10/54* (2006.01)
*H01M 6/52* (2006.01)

(52) U.S. Cl.
CPC ............. *H01M 10/54* (2013.01); *H01M 6/52* (2013.01); *Y02W 30/84* (2015.05)

(58) Field of Classification Search
CPC ......... H01M 10/54; H01M 6/52; Y02W 30/84
See application file for complete search history.

(56) References Cited

U.S. PATENT DOCUMENTS

| | | | |
|---|---|---|---|
| 6,180,278 B1 * | 1/2001 | Prickett | H01M 4/04 429/49 |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |

(Continued)

FOREIGN PATENT DOCUMENTS

| | | |
|---|---|---|
| CN | 102544629 B | 5/2015 |
| CN | 104609385 A | 5/2015 |

(Continued)

OTHER PUBLICATIONS

International Search Report and Written Opinion for International Application No. PCT/US2016/038329, dated Aug. 18, 2016, 13 pages.

*Primary Examiner* — Carlos Barcena
(74) *Attorney, Agent, or Firm* — Cooley LLP

(57) ABSTRACT

Embodiments described herein relate generally to methods for the remediation of electrochemical cell electrodes. In some embodiments, a method includes obtaining an electrode material. At least a portion of the electrode material is rinsed to remove a residue therefrom. The electrode material is separated into constituents for reuse.

29 Claims, 8 Drawing Sheets

(56) References Cited

U.S. PATENT DOCUMENTS

| | | | |
|---|---|---|---|
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 2009/0214933 A1* | 8/2009 | Sloop | H01M 10/052 429/49 |
| 2010/0047671 A1 | 2/2010 | Chiang et al. | |
| 2010/0124691 A1* | 5/2010 | Harris | H01M 2/361 429/50 |
| 2010/0323264 A1 | 12/2010 | Chiang et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0091391 A1* | 4/2012 | Tsuchida | H01M 6/18 252/182.1 |
| 2012/0164499 A1 | 6/2012 | Chiang et al. | |
| 2013/0055559 A1 | 3/2013 | Slocum et al. | |
| 2013/0065122 A1 | 3/2013 | Chiang et al. | |
| 2013/0309547 A1 | 11/2013 | Bazzarella et al. | |
| 2013/0323142 A1* | 12/2013 | Shimano | H01M 4/0471 423/49 |
| 2013/0337319 A1 | 12/2013 | Doherty et al. | |
| 2014/0004437 A1 | 1/2014 | Slocum et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170524 A1 | 6/2014 | Chiang et al. | |
| 2014/0227153 A1* | 8/2014 | Laucournet | C22B 7/006 423/141 |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0043450 A1* | 2/2016 | Sloop | C01G 53/50 252/182.1 |
| 2016/0056490 A1 | 2/2016 | Chiang et al. | |
| 2016/0056491 A1 | 2/2016 | Chiang et al. | |
| 2016/0093884 A1* | 3/2016 | Cui | H01M 4/364 252/506 |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0190544 A1 | 6/2016 | Slocum et al. | |
| 2016/0218375 A1 | 7/2016 | Chiang et al. | |
| 2016/0268621 A1 | 9/2016 | Chiang et al. | |
| 2016/0308218 A1 | 10/2016 | Ota et al. | |
| 2016/0344006 A1 | 11/2016 | Ota et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |
| 2017/0077464 A1 | 3/2017 | Bazzarella et al. | |
| 2017/0162863 A1 | 6/2017 | Doherty et al. | |
| 2017/0214034 A1 | 7/2017 | Ota et al. | |
| 2017/0237111 A1 | 8/2017 | Holman et al. | |
| 2017/0237112 A1 | 8/2017 | Holman et al. | |
| 2017/0288281 A1 | 10/2017 | Chiang et al. | |
| 2018/0034090 A1 | 2/2018 | Chiang et al. | |
| 2018/0175428 A1 | 6/2018 | Chiang et al. | |
| 2018/0233708 A1 | 8/2018 | Bazzarella et al. | |

FOREIGN PATENT DOCUMENTS

| | | | |
|---|---|---|---|
| EP | 0854530 A1 | | 7/1998 |
| JP | 2006-236859 | | 9/2006 |
| JP | 2006236859 A | * | 9/2006 |
| WO | WO 2009/105713 | | 8/2009 |
| WO | WO 2016/205780 | | 12/2016 |

* cited by examiner

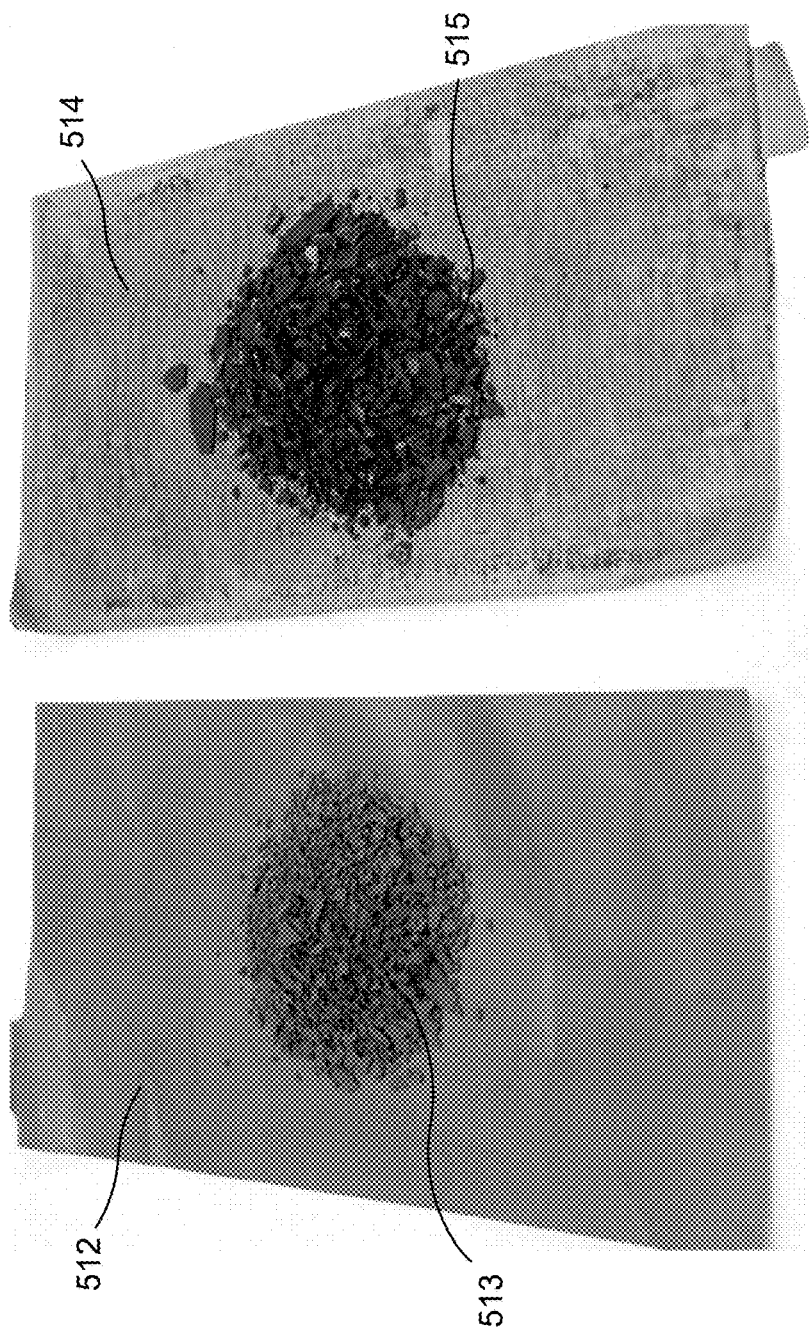

METHODS FOR ELECTROCHEMICAL CELL REMEDIATION

CROSS-REFERENCE TO RELATED APPLICATIONS

This application claims priority to and the benefit of U.S. Provisional Patent Application Ser. No. 62/182,241, entitled "Methods for Electrochemical Cell Remediation," filed Jun. 19, 2015, the disclosure of which is hereby incorporated by reference in its entirety.

BACKGROUND

Embodiments described herein relate generally to the remediation of electrochemical cell electrodes.

Batteries are typically constructed of solid electrodes, separators, electrolyte, and ancillary components, for example related to packaging, thermal management, cell balancing, consolidation of electrical current carriers into terminals, and/or other such components. Battery electrodes typically include active materials, conductive materials, binders (such as poly(vinylidene difluoride) ("PVDF") and styrene-butadiene rubber ("SBR")) and other additives that are calendered as a dried solid matrix coating onto a metallic substrate or current collector.

Some known methods for removing conventional electrode coatings involve immersion of the coatings in molten salt baths at very high temperatures (e.g., 450° C. or higher). Such methods have been found to cause damage to/erosion of the underlying current collector, and subsequent recovery of the coating constituents from the molten salt bath has been found to be uneconomical. Other approaches have involved the dissolution/leaching of electrode materials in strong acids. The use of harsh chemical treatments is necessary due to the difficulty of mechanically separating electrode components in a conventional electrode coating due both to the presence of large amounts of binder materials and also due to the hardness and density of the coating after the mechanical calendaring process. Still other approaches have involved electrolysis-based recovery of metals, requiring high power consumption and large investments in equipment, while resulting in large quantities of unrecovered electrode components.

Improved methods of remediating electrochemical cell electrodes are economically and environmentally desirable.

SUMMARY

Embodiments described herein relate generally to methods for the remediation of electrochemical cell electrodes. In some embodiments, a method includes obtaining an electrode material. At least a portion of the electrode material is rinsed to remove a residue therefrom. The electrode material is separated into constituents for reuse.

BRIEF DESCRIPTION OF THE DRAWINGS

FIGS. 5A and 5B are photographic partial views of positive (cathode) and negative (anode) current collectors, respectively, with their respective electrode materials having been physically removed, according to an embodiment.

DETAILED DESCRIPTION

Figure 1A:
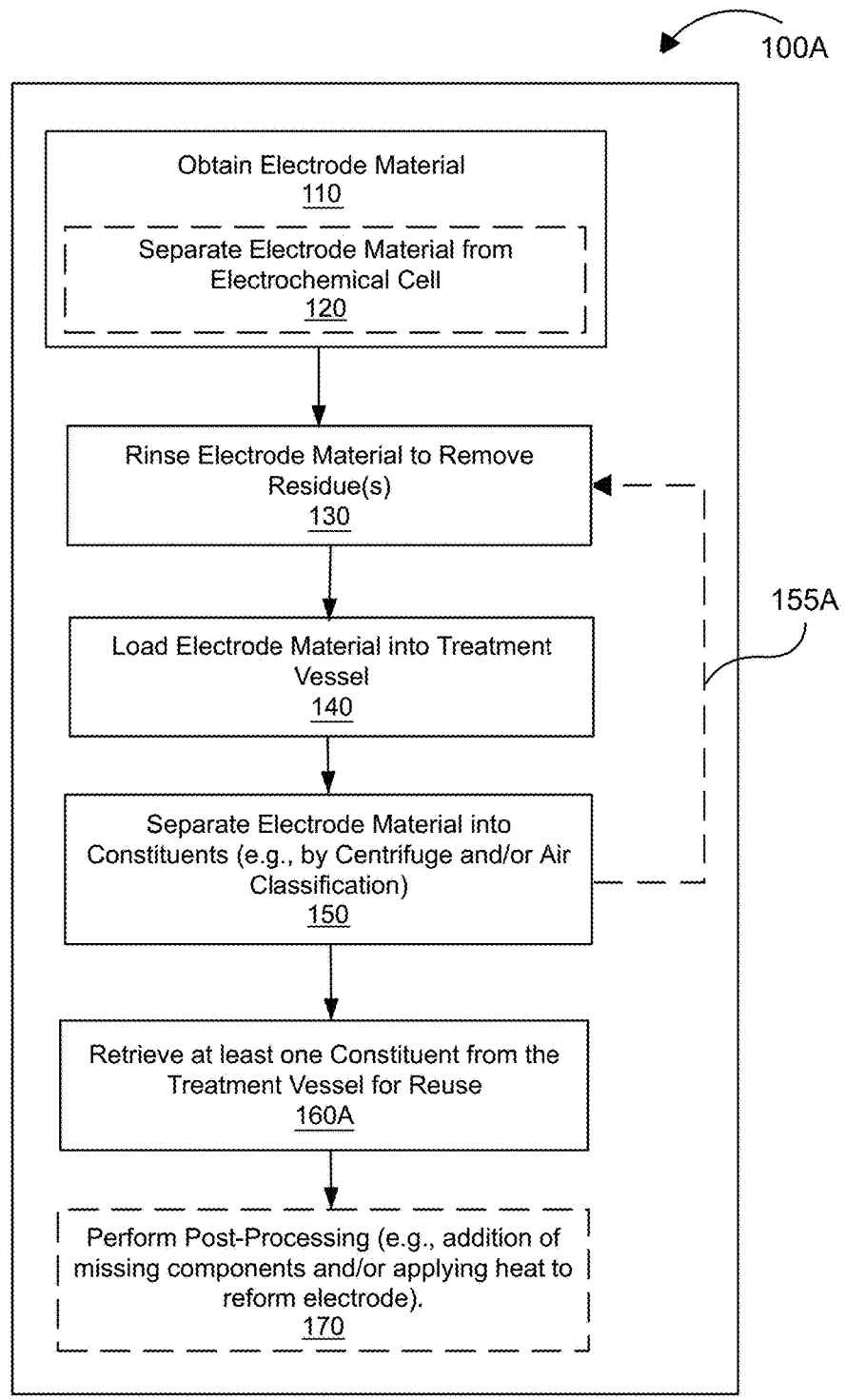
FIG. 1A is a flow diagram showing a process for the remediation/reclamation of an electrode material, according to an embodiment.

Rechargeable batteries, such as lithium ion batteries, exhibit capacity loss or "capacity fade" over the course of their service life, for example due to a loss of cycleable lithium and/or electrical disconnection of active materials. In a lithium ion battery, the full lithium inventory of the cell is provided by the positive electrode ("cathode") active material. Lithium can be lost by consumption in irreversible side reactions within a lithium-ion battery, such as the formation of the solid electrolyte interphase ("SEI") material or layer during initial charge cycling and the continued growth of the SEI layer during aging, storage, and/or cycling. Due to the fixed lithium budget of a cell, lithium lost due to any side reaction in the cell manifests as non-stoichiometry of the cathode active material. Capacity fade manifests as the reduced ability of the battery to deliver charge at the rated voltage. Conventional approaches to the recycling of conventional solid battery electrodes typically involve high-temperature chemical (e.g., acid) based dissolution of electrode materials, and are complicated by the need to remove binder materials/adhesives. These aggressive chemical recovery processes are necessitated by the difficulty in mechanically separating the components of traditional electrode coatings. Many such approaches are time and labor intensive, costly to implement, and low-yielding in terms of useful feedstock materials. Nevertheless, recycling is an ongoing goal of most battery producers, given the variety of valuable components in most battery compositions, and the economic and environmental costs associated with the wholesale disposal of electrochemical cells. Due to the aforementioned challenges, an improved method for reclaiming electrode materials is needed.

Embodiments described herein relate generally to methods for the remediation (also "recycling," "reconstituting," "reclamation," "refurbishment," "repurposing" or "remanufacturing") of semi-solid electrochemical cell electrodes (as described further herein), and can also be implemented for conventional battery electrodes. In some embodiments, a method of remediation includes obtaining an electrode material. For example, the electrode material can include a depleted (i.e., used, sub-stoichiometric, non-stoichiometric, or "spent") electrode material (e.g., a cathode electrode material or an anode electrode material). Furthermore, the "depleted" electrode material as described herein can include an electrode material that has been formed into an electrode, an electrode material that has been formed into an electrochemical cell, an electrode material that has been used in an electrochemical cell, and/or an electrode material that has functioned in an electrochemical reaction. In other words, the electrode material that has come into existence as an electrode can be considered a "depleted" electrode material as it is no longer a pristine electrode material. In some embodiments, the electrode material can include substantially depleted, semi-depleted, partially depleted, and almost depleted electrode material.

After obtaining an electrode material, i.e., a depleted electrode material, optionally, at least a portion of the depleted electrode material is rinsed to remove a residue (e.g., an electrolyte salt or side-reaction products) therefrom. The depleted electrode material is separated into constituents (e.g., active materials, conductive additive(s), etc.) for reuse. In some embodiments, the depleted electrode material is a semi-solid anode material or a semi-solid cathode material. In some embodiments, the depleted electrode material does not include a binder. In some embodiments, rinsing and separation are performed concurrently (e.g., in the same medium). Methods described herein allow for the isolation and recovery of active materials (or "ion storage materials") and other electrode constituents, at a reduced cost and energy input when compared with traditional battery recycling approaches.

Semi-solid electrodes, remediated according to methods described herein, are considerably more recyclable than traditional battery electrodes for several reasons. For example, the liberation/separation of depleted semi-solid electrode material (i.e., from a current collector) can be performed mechanically instead of chemically, and can require a low applied force to remove (e.g., the semi-solid electrode material can have a low adhesion strength), for example due its semi-solid physical state and/or the absence of a binder. Semi-solid electrode materials can thus be safely and readily removed from current collectors without inflicting damage on the current collectors, and with substantially less (or no) contamination of the salvaged electrode materials with metal(s) (e.g., copper, aluminum, etc.) from the current collectors. Additionally, due to the absence of binder(s) in semi-solid electrodes, steps involving ingestion or dissolution of binders in strong acids (often at very high temperatures) are eliminated, and the isolation of active materials and conductive carbon can be cleaner and more effective. Moreover, scrap semi-solid electrode materials resulting from cell manufacturing processes are easier to process and reuse.

As used herein, the term "semi-solid" refers to a material that is a mixture of liquid and solid phases, for example, such as a particle suspension, colloidal suspension, emulsion, gel, or micelle. Examples of battery architectures utilizing semi-solid suspensions are described in International Patent Publication No. WO 2012/024499, entitled "Stationary, Fluid Redox Electrode," International Patent Publication No. WO 2012/088442, entitled "Semi-Solid Filled Battery and Method of Manufacture," and International Patent Publication No. WO 2014/093876, entitled "Semi-Solid Electrodes Having High Rate Capability," the entire disclosures of which are hereby incorporated by reference. See also the section titled "Semi-Solid Compositions," below.

As used herein, the terms "about" and "approximately" generally mean plus or minus 10% of the value stated, e.g., about 250 µm would include 225 µm to 275 µm, and about 1,000 µm would include 900 µm to 1,100 µm.

FIG. 1A is a flow diagram showing a process 100A for the remediation/reclamation of an electrode material, according to an embodiment. According to process 100A, one or more depleted electrode materials are first obtained, at 110, optionally by separating (at 120) the one or more depleted electrode materials from an electrochemical cell that has reached its "end of service," or that exhibits capacity fade. The "depleted" nature of the electrode refers to an at least partial degradation or loss or gain of material such that its active material is compositionally different from its state at the original assembly of the electrochemical device. For example, due to the loss of cyclable lithium in a lithium ion battery, the stoichiometry of the cathode active material may be measurably different from that of the "fresh" cathode material (i.e., there has been a shift in the relative quantities of its constituents), as shown in Tables 1A and 1B below, comparing elemental analyses (performed via inductively coupled plasma ("ICP") mass spectrometry) of fresh and recovered (respectively) 111 lithium nickel cobalt manganese oxide ($Li_{1+x}(Ni_{0.33}Co_{0.33}Mn_{0.33})_{1-x}O_2$—"NCM 111," also referred to as "NMC") cathodes. Table 1A shows that the composition of fresh NCM 111 material has a composition of $Li_{1.17}Ni_{0.37}Co_{0.38}Mn_{0.38}O_2$ and a lithium-to-transition-metal ratio of about 1.04. Table 1B shows that the composition of recovered/depleted NCM (originally NCM 111) material has a composition of $Li_{0.84}Ni_{0.63}Co_{0.25}Mn_{0.38}O_2$ and a lithium-to-transition-metal ratio of about 0.66 (i.e., a loss of lithium of about 36.5% as compared with fresh NCM 111). For a negative electrode ("anode") active material, such as graphite, silicon, tin, hard carbon, soft carbon, or the like, the compositional change may be reflected as an increased concentration of lithium (or other working ion) in the recovered anode active material compared to its initial state.

TABLE 1A

Example ICP analysis of Fresh NCM (NCM 111) Cathode Material

| | Li | Ni | Co | Mn | O (inferred as remainder of mass) | Transition Metal (Ni + Co + Mn) | Li/Transition Metal |
|---|---|---|---|---|---|---|---|
| Sample 1 Mass Percentages | 7.73 | 20.76 | 21.39 | 19.67 | 30.45 | 61.82 | 0.12504044 |
| Masses (g/mol) | 6.941 | 58.7 | 58.93 | 54.94 | 16 | | |
| Mol | 1.113672382 | 0.353662692 | 0.362973019 | 0.358026938 | 1.903125 | | |
| Mol when scaled to O2 | 1.17036178 | 0.371665226 | 0.381449478 | 0.376251627 | 2 | 1.1294 | 1.036299515 |

TABLE 1B

Example ICP analysis of Recovered NCM Cathode Material

|  | Li | Ni | Co | Mn | O (inferred as remainder of mass) | Transition Metal (Ni + Co + Mn) | Li/Transition Metal |
| --- | --- | --- | --- | --- | --- | --- | --- |
| Sample 2 Mass Percentages | 5.26 | 33.41 | 13.57 | 18.82 | 28.94 | 65.8 | 0.07993921 |
| Masses (g/mol) | 6.941 | 58.7 | 58.93 | 54.94 | 16 | | |
| Mol | 0.757815877 | 0.569165247 | 0.230273205 | 0.342555515 | 1.80875 | | |
| Mol when scaled to O2 | 0.8379443 | 0.629346507 | 0.254621374 | 0.378775967 | 2 | 1.2627 | 0.663590087 |

The separation 120 may involve disassembly of the electrochemical cell. Prior to disassembly, the electrochemical cell includes a positive current collector, a negative current collector, and a separator disposed between the positive current collector and the negative current collector. The positive current collector is spaced from the separator and at least partially defines a positive electroactive zone. The negative current collector is spaced from the separator and at least partially defines a negative electroactive zone. A cathode (positive electrode) is disposed in the positive electroactive zone and an anode (negative electrode) is disposed in the negative electroactive zone. In some embodiments, the cathode can be a conventional or solid cathode. In some embodiments, the cathode can be a semi-solid cathode. In other words, the cathode can comprise a semi-solid electrode composition (also referred to herein as "semi-solid suspension" and/or "slurry")—see "Semi-Solid Compositions" below. In some embodiments, the anode can be a conventional or solid anode, for example, a lithium metal anode, a solid graphite electrode, or a calendered anode. In some embodiments, the anode can be a semi-solid anode. In other words, the anode can comprise a semi-solid electrode composition (also referred to herein as "semi-solid suspension" and/or "slurry")—see "Semi-Solid Compositions" below. In some embodiments, the electrochemical cell includes both a semi-solid cathode and a semi-solid anode.

The positive current collector and the negative current collector can be any current collectors that are electronically conductive and are electrochemically inactive under the operation conditions of the cell. Typical current collectors for lithium cells include copper, aluminum, or titanium for the negative current collector and aluminum for the positive current collector, in the form of sheets or mesh, or any combination thereof. Current collector materials can be selected to be stable at the operating potentials of the positive and negative electrodes of an electrochemical cell. For example, in non-aqueous lithium systems, the positive current collector can include aluminum, or aluminum coated with conductive material that does not electrochemically dissolve at operating potentials of 2.5-5.0V with respect to Li/Li$^+$. Such materials include platinum, gold, nickel, conductive metal oxides, such as vanadium oxide, and carbon. The negative current collector can include copper or other metals that do not form alloys or intermetallic compounds with lithium, carbon, and/or coatings comprising such materials disposed on another conductor.

The anode can include an anode active material selected from lithium metal, carbon, lithium-intercalated carbon, lithium nitrides, lithium alloys, and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof. The anode can also include an intercalation oxide, such as $Li_4Ti_5O_{12}$ (also referred to as LTO) or $TiO_2$, or a metal salt that undergoes a conversion or displacement reaction. Examples of a metal oxide that converts to $Li_2O$ and the metal upon reaction with lithium can include CoO, NiO, MnO, and FeO. Examples of a metal fluoride that converts to LiF and the metal upon reaction with lithium can include $FeF_2$, $FeF_3$, and $BiF_3$.

In some embodiments, the anode can be a semi-solid stationary anode. In some embodiments, the anode can be a semi-solid flowable anode, for example, of the type used in redox flow cells.

The anode can also include a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other carbonaceous material or combination thereof. In some embodiments, the anode can also include a non-aqueous liquid electrolyte.

In some embodiments, the anode can include about 35% to about 75% by volume of an active material. In some embodiments, the anode can include about 40% to about 75% by volume, about 45% to about 75% by volume, about 50% to about 75% by volume, about 55% to about 75% by volume, about 60% to about 75% by volume, or about 65% to about 75% by volume of an active material, inclusive of all ranges therebetween.

In some embodiments, the anode can include about 0% to about 10% by volume of a conductive material. In some embodiments, the anode can include about 0.2% to about 9% by volume, about 0.4% to about 8% by volume, about 0.6% to about 7% by volume, about 0.8% to about 6% by volume, about 1% to about 5% by volume, or about 2% to about 4% by volume of a conductive material, inclusive of all ranges therebetween. In some embodiments, the anode can include about 1% to about 6% by volume of a conductive material. In some embodiments, the anode can include about 0.5% to about 2% by volume of a conductive material, inclusive of all ranges therebetween.

In some embodiments, the anode can include about 10% to about 70% by volume of an electrolyte. In some embodiments, the anode can include about 30% to about 50%, or about 20% to about 40% by volume of an electrolyte, inclusive of all ranges therebetween.

The cathode can be a semi-solid stationary cathode or a semi-solid flowable cathode, for example of the type used in redox flow cells. The cathode can include an active material such as a lithium bearing compound as described in further detail below. The cathode can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode can also include a non-aqueous liquid electrolyte as described in further detail below.

In some embodiments, the cathode and/or the anode can include active materials and optionally conductive materials in particulate form suspended in a non-aqueous liquid electrolyte. In some embodiments, the conductive particles have shapes, which may include spheres, platelets, or rods to optimize solids packing fraction, increase the semi-solid's net electronic conductivity, and improve rheological behavior of semi-solids. In some embodiments, low aspect or substantially equiaxed or spherical particles are used to improve the ability of a semi-solid electrode material to flow under stress.

In some embodiments, the particles have a plurality of sizes so as to increase packing fraction. In particular, the particle size distribution can be bi-modal, in which the average particle size of the larger particle mode is at least 5 times larger than average particle size of the smaller particle mode. In some embodiments, the mixture of large and small particles improves flow of the material during cell loading and increases solid volume fraction and packing density in the loaded cell.

In some embodiments, the cathode can include about 35% to about 75% by volume of an active material. In some embodiments, the cathode can include about 40% to about 75% by volume, 45% to about 75% by volume, about 50% to about 75% by volume, about 55% to about 75% by volume, about 60% to about 75% by volume, or about 65% to about 75% by volume of an active material, inclusive of all ranges therebetween. In some embodiments, the cathode can include about 0.5% to about 8% by volume of a conductive material. In some embodiments, the cathode can include about 0.6% to about 7.5% by volume, about 0.7% to about 7.0% by volume, about 0.8% to about 6.5% by volume, about 0.9% to about 6% by volume, about 1.0% to about 6%, about 1.5% to about 5.0% by volume, or about 2% to about 4% by volume of a conductive material, inclusive of all ranges therebetween. In some embodiments, the cathode can include about 25% to about 70% by volume of an electrolyte. In some embodiments, the cathode can include about 30% to about 50%, or about 20% to about 40% by volume of an electrolyte, inclusive of all ranges therebetween.

In some embodiments, the cathode and/or the anode can have a thickness of less than 100 μm (final single sided coated thickness). In some embodiments, the cathode (e.g., a semi-solid cathode) and/or the anode (e.g., a semi-solid anode) can have a thickness in the range of about 250 μm to about 2,000 μm. In some embodiments, the cathode and/or the anode can have a thickness in the range of about 250 μm to about 600 μm, about 300 μm to about 600 μm, about 350 μm to about 600 μm, about 400 μm to about 600 μm, about 450 μm to about 600 μm, or about 500 μm to about 600 μm, inclusive of all ranges therebetween.

Separation of the depleted electrode material (e.g., anode or cathode material(s)) from the electrochemical cell can comprise mechanical removal, for example by scraping, brushing, crumpling of the current collector such that the depleted electrode material flakes off, etc. In some embodiments, the separation of the depleted electrode material from the electrochemical cell does not involve the use of chemicals (i.e., is only mechanical). In some embodiments, the separation of the depleted electrode material from the electrochemical cell comprises the "clean" removal of the electrode material from its respective current collector (i.e., such that little or no damage is done to the current collector, and/or substantially none of the current collector material is present in the separated electrode material). As discussed above, mechanical separation (i.e., from a current collector) of depleted semi-solid electrode material, in particular, may require only a low applied force to remove, for example due to its semi-solid physical state and/or the absence of a binder. After the depleted electrode material is separated from the current collector, it may optionally be pulverized or ground to produce a free flowing powder for subsequent process steps. Optionally, this pulverization or grinding step may be applied at another time in the process or it may be applied several times in the process.

In some embodiments, the depleted active material can be remediated with a reagent and/or heat to restore the active material to "like new" condition. Regardless of the separation method, the depleted active material retains the morphology of the original (i.e., "fresh") active material so remediation does not require significant processing. In other words, since the active material itself is not dissolved, mechanically ground, or otherwise modified, the depleted active material can be restored to the like new condition using simple processing techniques.

In some embodiments, a solvent can be used to dissolve binder from a recovered electrochemical cell. For example, NMP solvent, acetone, or DMSO can be used to dissolve only the binder from an end of life or spent electrode, without damaging the active material. This recovered active material can be subsequently subjected to the remediation steps described herein to restore the active material to "like new" condition.

The depleted electrode material is rinsed or washed, at 130, to remove one or more residues, such as electrolyte salt(s), electrolyte solvent, or a reaction product including but not limited to a solid-electrolyte-interphase (SEI) formed during the operation of the battery. The rinse medium can be any polar organic solvent, such as dimethyl carbonate ("DMC") or any solvent that is miscible with the electrolyte and in which the electrolyte salt(s) is soluble. For example, solvents may include but are not limited to ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate, y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. The rinse can be performed, for example, by immersion of the depleted electrode material in the rinse medium/solvent with or without agitation. In some embodiments, the rinse medium can be recycled or reused during or after the process 100A. In some embodiments, the rinse medium may be water or an aqueous solution, such as an acidic or alkaline solution. In some embodiments, the rinse medium may be an acidic solution intended to preferentially dissolve away side-reaction products (including the SEI material or layer) from an anode active material.

The rinsed depleted electrode material (with or without the rinse medium, as discussed below) is loaded, at 140, into a treatment vessel. The treatment vessel is selected based on the separation technique that will subsequently be employed at 150. The material may optionally be subjected to a pulverization or grinding step before or during transfer to the treatment vessel. For example, the treatment vessel can comprise, by way of example, a centrifuge vial/tube, a separation chamber of an air classifier machine, a beaker, a tank, or any other suitable vessel. The depleted electrode material is then at least partially separated, at 150, into constituent parts using one or more separation techniques, such as centrifugation, air classification, or any other suitable separation/fractionation technique (e.g., filtration, sieving, sedimentation, field flow fractionation, electrophoresis, and/or the like). In certain embodiments, constituent materials may be separated on the basis of other physical properties, such as magnetic properties, provided there is a significant difference in the relevant physical property between the various components. In some embodiments, the separation of an electrode material or binderless electrode material can include separating into a first portion and a second portion. In some embodiments, the separation further includes a third portion, a fourth portion, a fifth portion, and so on. As described herein, the first portion, the second portion, and the third portion can include any one of the constituents or separated constituents, such as an active electrode material, including active cathode material and an active anode material, a metal, a conductive carbon material, electrolyte salt, salt, reaction-byproducts, SEI materials, and the like. In some embodiments, the first portion can include an active electrode material and the second portion including a conductive carbon material. In some embodiments, the third portion can include a metal.

Centrifugation involves placing one or more samples into rotation about a fixed axis such that centripetal acceleration causes sedimentation of the sample contents. In some embodiments, the depleted electrode material and rinse medium, together forming a dilute dispersion, are loaded into a centrifuge vial/tube at 140 and centrifuged (e.g., for 2 minutes at a rotational speed of 1,000 rpm) at 150, such that the solids (e.g., active material(s) and conductive carbon) separate to the bottom of the treatment vessel (the centrifuge vial/tube), and the supernatant (e.g., the rinse medium or solvent) is disposed atop the solids. The solids may undergo sedimentation, such that constituents of the solid segregate into stratified layers based on their particle size and/or density. The supernatant can be decanted/removed from the centrifuge vial/tube. In some embodiments, decanted supernatant and/or rinse medium is discarded. In some embodiments, salt from the decanted supernatant and/or rinse medium (i.e., comprising a polar solvent and one or more salts in solution) is reclaimed, for example by adding a non-polar solvent, such as hexane to the supernatant or rinse medium to precipitate the salt and, optionally, performing one or more purification steps prior to reuse of the salt. Optionally, in some embodiments, the supernatant may be further treated to recover additional materials; for example, addition of a strong base, such as ammonium hydroxide to precipitate a lithium salt, such as lithium hydroxide from the rinse solution.

Air classification involves placing one or more samples into a treatment chamber containing a column of rising air that exerts an upward aerodynamic air drag force on the one or more samples, causing them to separate vertically (i.e., fractionate) according to size, shape, density, mass, etc. In some embodiments, the depleted electrode material is loaded without the rinse medium into a separation chamber of an air classifier at 140, and sorted into constituent parts by air classification.

Optionally, the process 100A loops (i.e., steps 130, 140, and 150 can be repeated in a loop), at 155A, such that one or more constituents (e.g., an active material) resulting from the separation 150 are again rinsed, at 130, to remove one or more residues. This subsequent rinse may be performed in the same treatment vessel that was used for the separation 150, or the one or more constituents may be transferred to a separate rinse vessel for rinsing at 130 and then again loaded into a treatment vessel for a second separation step 150 (which may involve the same separation technique used during the first pass, or alternatively, a different technique (centrifuge or air classification). One or more "rinse and separate" loops 155A can be performed as part of process 100A.

At least one constituent (e.g., an active cathode material, an active anode material, or a conductive carbon material) is retrieved or "reclaimed," at 160A, from the treatment vessel for reuse. Post-processing steps can be applied, at 170, to the reclaimed constituent material, for example to correct its composition, or to otherwise remediate or reconstitute it. For example, post-processing can include the addition of an additive, e.g., to compensate for one or more "missing" components, through mixing. In some embodiments, the additive comprises a lithium source, such as lithium carbonate, lithium hydroxide, lithium nitrate, lithium sulfate, or any lithium salt, when the reclaimed constituent material is a cathode material. In some embodiments, the additive comprises a lithium source, such as lithium carbonate, lithium hydroxide, lithium nitrate, lithium sulfate, or any lithium salt, when the reclaimed constituent material is an anode material (for example, to "pre-lithiate" the anode). In addition or alternatively, the additive can comprise any material described herein, for example under the heading "Semi-Solid Compositions" below. In some embodiments, the at least one reclaimed constituent, optionally combined with any additive or material described herein, is formed or incorporated into a fresh, recycled electrode (e.g., a solid electrode or a semi-solid electrode). The reconstituted/recycled cathode and/or anode can be disposed on a respective current collector using any suitable method, for example, coated, casted, drop coated, pressed, roll pressed, or deposited. The remediation atmosphere can be similar to that used in the original production of the electrode material (i.e., prior to depletion, or in its original manufacture). For example, remediation of metal-oxide cathodes such as $LiCoO_2$ (lithium cobalt oxide, "LCO"), $Li(Ni, Mn, Co)O_2$ (lithium nickel manganese cobalt oxide, "NMC," which is also referred to as "NCM"), $LiNi_{0.8}Co_{0.15}Al_{0.05}O_2$ (lithium nickel cobalt aluminum oxide, "NCA"), $LiMn_2O_4$ (lithium manganese oxide, "LMO"), $LiCoPO_4$ (lithium cobalt phosphate, "LCP"), and $LiNiPO_4$ (lithium nickel phosphate, "LNP") can be done in an oxidizing or inert atmosphere, while remediation of other materials such as $LiFePO_4$ (lithium iron phosphate, "LFP"), $LiMnPO_4$ (lithium manganese phosphate, "LMP"), $LiMn_{0.85}Fe_{0.15}PO_4$ (lithium manganese iron phosphate, "LMFP"), and $Li_4Ti_5O_{12}$ (lithium titanate, "LTO") can be done in an inert or reducing environment. One or more heat treatment steps can be performed to the reclaimed electrode material and/or to the recycled electrode, for example to restore crystalline order, to collapse or evaporate one or more surface molecules (such as surfactants), and/or to densify the reclaimed material.

In some embodiments, the remediated electrode comprises a semi-solid suspension, and a redox mediator is used to improve the charge transfer within the semi-solid suspension. In some embodiments, the redox mediator is based on $Fe^{2+}$ or $V^{2+}$, $V^{3+}$, or $V^{4+}$. In some embodiments, the redox mediator is ferrocene. In some embodiments, the cathode can have an electronic conductivity of at least about $10^{-3}$ S/cm, or at least about $10^{-2}$ S/cm. In some embodiments, the semi-solid suspension is a cathode suspension with a mixing index of at least about 0.9, at least about 0.95, or at least about 0.975. In some embodiments, a semi-solid anode suspension can have a mixing index of at least about 0.9, at least about 0.95, or at least about 0.975.

Semi-Solid Compositions

In some embodiments, the semi-solid cathode and in some embodiments, the anode (e.g., a semi-solid anode) function collectively as an ion-storage/ion-source, electron conductor, and ionic conductor in a single medium that acts as a working electrode.

The cathode and/or anode semi-solid ion-storing redox composition as described herein can have, when taken in molarity (moles per liter), at least 10M (mol/L) concentration of redox species. In some embodiments, the cathode and/or the anode semi-solids ion-storing redox composition can include at least 12M, at least 15M, or at least 20M of the redox species. The electrochemically active material can be an ion storage material and or any other compound or ion complex that is capable of undergoing Faradaic reaction in order to store energy. The electroactive material can also be a multiphase material including the above described redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $Li^+$, $Na^+$, or other alkali ions are the working ions, even alkaline earth working ions, such as $Ca^{2+}$, $Mg^{2+}$, or $Al^{3+}$. In each of these instances, a negative electrode storage material and a positive electrode storage material may be used, the negative electrode storing the working ion of interest at a lower absolute electrical potential than the positive electrode. The cell voltage can be determined approximately by the difference in ion-storage potentials of the two ion-storage electrode materials.

Systems employing negative and/or positive ion-storage materials that are insoluble storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the semi-solid cathode electroactive material contains lithium positive electroactive materials and the lithium cations are shuttled between the anode (e.g., a semi-solid anode) and the semi-solid cathode, intercalating into solid, host particles suspended in a liquid electrolyte.

In some embodiments, at least one of the semi-solid cathode and/or anode (e.g., a semi-solid anode) includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that can be liquid under the operating conditions of the battery. Such a liquid form may also be diluted by or mixed with another, non-redox-active liquid that is a diluent or solvent, including mixing with such diluents to form a lower-melting liquid phase. In some embodiments, the redox-active component can comprise, by mass, at least 10% of the total mass of the electrolyte. In other embodiments, the redox-active component will comprise, by mass, between approximately 10% and 25% of the total mass of the electrolyte. In some embodiments, the redox-active component will comprise by mass, at least 25% or more of the total mass of the electrolyte.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers, such as polyaniline or polyacetylene based materials, polynitroxide or organic radical electrodes (such as those described in: H. Nishide et al., *Electrochim. Acta*, 50, 827-831, (2004), and K. Nakahara, et al., *Chem. Phys. Lett.*, 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials*, DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-sub stituted polystyrene, ferrocene-substituted polyethylene, carbazole-substituted polyethylene, polyoxyphenazine, polyacenes, or poly(heteroacenes). The conductive additives form an electrically conducting framework within the insulating liquid redox compounds that significantly increases the electrically conductivity of the composition. In some embodiments, the conductive addition forms a percolative pathway to the current collector. In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials for use in the semi-solid cathode include solid compounds known to those skilled in the art as those used in Nickel-metal Hydride (NiMH) and Nickel Cadmium (NiCd) batteries. Still other positive electrode compounds for Li storage include those used in carbon monofluoride batteries, generally referred to as $CF_x$, or metal fluoride compounds having approximate stoichiometry $MF_2$ or $MF_3$ where M comprises, for example, Fe, Bi, Ni, Co, Ti, or V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi: 10.1038/nnano.2007.411. In some embodiments, electroactive materials for the semi-solid cathode in a lithium system can include the general family of ordered rocksalt compounds $LiMO_2$ including those having the $\alpha$-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC" or "NCM"). Other families of exemplary cathode 140 electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds, such as $LiVPO_4F$, other "polyanion" compounds as described below, and vanadium oxides $V_xO_y$ including $V_2O_5$ and $V_6O_{11}$.

In some embodiments, the semi-solid cathode electroactive material comprises a transition metal polyanion compound, for example as described in U.S. Pat. No. 7,338,734. In some embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD4)_z$, or $A_x(M'_{1-a}M''_a)_y(X_2D_7)_z$, and have values such that x, plus y(1-a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)_z$ $(A_{1-a}M''_a)_xM'_y(X_2D_7)_z$ and have values such that (1-a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant, such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15-0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides, such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides, such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments, the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a nonaqueous or aqueous lithium system. In some embodiments, a $CF_x$ electrode, $FeS_2$ electrode, or $MnO_2$ electrode is a positive electrode used with a lithium metal negative electrode to produce a lithium battery. In some embodiments, such battery is a primary battery. In some embodiments, such battery is a rechargeable battery.

In some embodiments, the working ion is selected from the group consisting of $Li^+$, $Na^+$, $H^+$, $Mg^{2+}$, $Al^{3+}$, or $Ca^{2+}$.

In some embodiments, the working ion is selected from the group consisting of $Li^+$ or $Na^+$.

In some embodiments, the semi-solid ion-storing redox composition includes a solid including an ion-storage compound.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides, such as $CuF_2$, $FeF_2$, $FeF_3$, $BiF_3$, $CoF_2$, and $NiF_2$.

In some embodiments, the ion is lithium and the ion storage compound is selected from the group consisting of metal oxides, such as CoO, $Co_3O_4$, NiO, CuO, MnO.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1-a) times a formal valence or valences of M', plus ya times a formal valence or valence of M", is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1-a)x plus the quantity ax times the formal valence or valences of M" plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the $\alpha$-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg or Zr.

In some embodiments, the semi-solid ion storing redox composition includes a solid including amorphous carbon, disordered carbon, graphitic carbon, or a metal-coated or metal decorated carbon.

In some embodiments, the semi-solid ion storing redox composition can include a solid including nanostructures, for example, nanowires, nanorods, and nanotetrapods.

In some embodiments, the semi-solid ion storing redox composition includes a solid including an organic redox compound.

In some embodiments, the positive electrode can include a semi-solid ion storing redox composition including a solid selected from the groups consisting of ordered rocksalt compounds $LiMO_2$ including those having the $\alpha$-$NaFeO_2$ and orthorhombic-$LiMnO_2$ structure type or their derivatives of different crystal symmetry, atomic ordering, or partial substitution for the metals or oxygen, wherein M Includes at least one first-row transition metal but may include non-transition metals including but not limited to Al, Ca, Mg, or Zr. The anode can include a semi-solid ion-storing composition including a solid selected from the group consisting of amorphous carbon, disordered carbon, graphitic carbon, or a metal-coated or metal-decorated carbon.

In some embodiments, the semi-solid cathode 140 can include a semi-solid ion-storing redox composition such as, for example, a solid selected from the group consisting of $A_x(M'_{1-a}M''_a)_y(XD_4)_z$, $A_x(M_{1-a}M''_a)_y(DXD_4)_z$, and $A_x(M'_{1-a}M''_a)_y(X_2D_7)_z$, and where x, plus y(1-a) times a formal valence or valences of M', plus ya times a formal valence or valence of M", is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. In some embodiments, the anode can be semi-solid anode which includes a semi-solid ion-storing redox composition such as, for example, a solid selected from the group consisting of amorphous carbon, disordered carbon, graphitic carbon, or a metal-coated or metal-decorated carbon. In some embodiments, the anode can include a semi-solid ion-storing redox composition including a compound with a spinel structure.

In some embodiments, the semi-solid cathode can include a semi-solid ion-storing redox composition such as, for example, a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In some embodiments the semi-solid battery is a lithium battery, and the anode compound includes graphite, graphitic or non-graphitic carbon, amorphous carbon, mesocarbon microbeads, boron-carbon alloys, hard or disordered carbon, lithium titanate spinel, or a solid metal or metal alloy or metalloid or metalloid alloy that reacts with lithium to form intermetallic compounds, e.g., Si, Ge, Sn, Bi, Zn, Ag, Al, any other suitable metal alloy, metalloid alloy or combination thereof, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions, any other materials or alloys thereof, or any other combination thereof.

In some embodiments, the electrochemical function of the electrochemical cell can be improved by mixing or blending the semi-solid cathode and/or the semi-solid anode particles with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-sub stituted polystyrene, ferrocene-substituted polyethylene, carbazole-substituted polyethylene, polyoxyphenazine, polyacenes, or poly(heteroacenes).). In some embodiments, the resulting semi-solid cathode and/or semi-solid anode mixture has an electronic conductivity of at least about $10^{-3}$ S/cm, of at least about $10^{-2}$ S/cm or more.

In some embodiments, the particles included in the semi-solid cathode and/or semi-solid anode can be configured to have a partial or full conductive coating.

In some embodiments, the semi-solid ion-storing redox composition includes an ion-storing solid coated with a conductive coating material. In some embodiments, the conductive coating material has higher electron conductivity than the solid. In some embodiments, the solid is graphite and the conductive coating material is a metal, metal carbide, metal oxide, metal nitride, or carbon. In some embodiments, the metal is copper.

In some embodiments, the solid of the semi-solid ion-storing material is coated with metal that is redox inert at the operating conditions of the redox energy storage device. In some embodiments, the solid of the semi-solid ion storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight metallic copper. In some embodiments, the storage material particle is coated with about 3.0% by weight metallic copper. In some embodiments, the storage material particle is coated with about 8.5% by weight metallic copper. In some embodiments, the storage material particle is coated with about 10.0% by weight metallic copper. In some embodiments, the storage material particle is coated with about 15.0% by weight metallic copper. In some embodiments, the storage material particle is coated with about 20.0% by weight metallic copper.

In some embodiments, the conductive coating is placed on the semi-solid cathode and/or anode particles by chemical precipitation of the conductive element and subsequent drying and/or calcination.

In some embodiments, the conductive coating is placed on the semi-solid cathode and/or anode particles by electroplating (e.g., within a fluidized bed).

In some embodiments, the conductive coating is placed on the semi-solid cathode and/or anode particles by co-sintering with a conductive compound and subsequent comminution.

In some embodiments, the electrochemically active particles have a continuous intraparticle conductive material or are embedded in a conductive matrix.

In some embodiments, a conductive coating and intraparticulate conductive network is produced by multicomponent-spray-drying, a semi-solid cathode and/or anode particles and conductive material particulates.

In some embodiments, the semi-solid composition (e.g., the semi-solid cathode composition or the semi-solid anode composition) also includes conductive polymers that provide an electronically conductive element. In some embodiments, the conductive polymers can include one or more of a polyacetylene, polyaniline, polythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive polymer can be a compound that reacts in-situ to form a conductive polymer on the surface of the active material particles. In some embodiments, the compound can be 2-hexylthiophene or 3-hexylthiophene and oxidizes during charging of the battery to form a conductive polymer coating on solid particles in the cathode semi-solid suspension. In other embodiments, redox active material can be embedded in conductive matrix. The redox active material can coat the exterior and interior interfaces in a flocculated or agglomerated particulate of conductive material. In some embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, inexpensive iron compounds such as pyrite ($FeS_2$) are used as inherently electronically conductive ion storage compounds. In some embodiments, the ion that is stored is $Li^+$.

In some embodiments, redox mediators are added to the semi-solid to improve the rate of charge transfer within the semi-solid electrode. In some embodiments, this redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the surface conductivity or charge transfer resistance of the positive current collectors and/or the negative current collector included in the electrochemical cell is increased by coating the current collector surface with a conductive material. Such layers can also serve as a synthetic SEI layer. Non-limiting examples of conductive coating materials include carbon, a metal, metal-carbide, metal nitride, metal oxide, or conductive polymer. In some embodiments, the conductive polymer includes but is not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocene-sub stituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In some embodiments, the compound is 2-hexylthiophene and oxidizes at a high potential to form a conductive polymer coating on the current collector. In some embodiments; the current collector is coated with metal that is redox-inert at the operating conditions of the redox energy storage device.

The semi-solid redox compositions can include various additives to improve the performance of the redox cell. The liquid phase of the semi-solids in such instances would comprise a solvent, in which is dissolved an electrolyte salt, and binders, thickeners, or other additives added to improve stability, reduce gas formation, improve SEI formation on the negative electrode particles, and the like. Examples of such additives included vinylene carbonate (VC), vinylethylene carbonate (VEC), fluoroethylene carbonate (FEC), or alkyl cinnamates, to provide a stable passivation layer on the anode or thin passivation layer on the oxide cathode, propane sultone (PS), propene sultone (PrS), or ethylene thiocarbonate as antigassing agents, biphenyl (BP), cyclohexylbenzene, or partially hydrogenated terphenyls, as gassing/safety/cathode polymerization agents, or lithium bis(oxatlato)borate as an anode passivation agent.

In some embodiments, semi-solid redox compositions are binder-free.

In some embodiments, the semi-solid cathode and/or anode can include a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include y-butyrolactone, dimethoxyethane, tetrahydrofuran, 2-methyl tetrahydrofuran, 1,3-dioxolane, 4-methyl-1,3-dioxolane, diethyl ether, sulfolane, methyl sulfolane, acetonitrile, propiononitrile, ethyl acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

In some embodiments, the non-aqueous cathode and/or anode semi-solid compositions are prevented from absorbing impurity water and generating acid (such as HF in the case of $LiPF_6$ salt) by incorporating compounds that getter water into the active material suspension, or into the storage tanks or other plumbing of the system, for example, in the case of redox flow cell batteries. Optionally, the additives are basic oxides that neutralize the acid. Such compounds include but are not limited to silica gel, calcium sulfate (for example, the product known as Drierite), aluminum oxide and aluminum hydroxide.

In some embodiment, the cathode can be a semi-solid cathode and the anode can be a conventional anode for example, a solid anode formed from the calendering process as is commonly known in the arts. In some embodiments, the cathode can be a semi-solid cathode and the anode can also be a semi-solid anode as described herein. In some embodiments, the cathode and the anode can both be semi-solid flowable electrodes, for example, for use in a redox flow cell.

In some embodiments, the semi-solid cathode and the semi-solid anode can be prepared by combining a quantity of an active material with an electrolyte and a conductive material, and mixing until a substantially stable suspension forms that has a mixing index of at least about 0.9, at least about 0.95, or at least about 0.975, inclusive of all ranges therebetween. In some embodiments, the semi-solid cathode and/or the semi-solid anode material is mixed until the electrode material has an electronic conductivity of at least about $10^{-3}$ S/cm, or at least about $10^{-2}$ S/cm, inclusive of all ranges therebetween. In some embodiments, the electrode material is mixed until the electrode material has an apparent viscosity of less than about 25,000 Pa-s, less than about 10,000 Pa-s, less than about 1,000 Pa-s, or less than about 100 Pa-s at an apparent shear rate of about 5 $s^{-1}$, inclusive of all ranges therebetween. In such embodiments, the semi-solid cathode 140 can include about 35-75 vol % of active material and about 0.5-8 vol % of conductive material, and the semi-solid anode can include about 35-75 vol % of active material and about 0-10 vol % of conductive material. Furthermore, the electrochemical cell that includes the semi-solid cathode 140 and/or the semi-solid anode can have an area specific capacity of at least about 7 $mAh/cm^2$, for example, at least about 8 $mAh/cm^2$, at least about 9 $mAh/cm^2$, or at least about 10 $mAh/cm^2$. In some embodiments, the active material included in the semi-solid cathode can be LFP. In such embodiments, the electrochemical can have an area specific capacity of at least about 7 $mAh/cm^2$ at a C-rate of C/4. In some embodiments, the active material included in the semi-solid cathode can be NCM. In such embodiments, the electrochemical cell can have an area specific capacity of at least about 7 $mAh/cm^2$ at a C-rate of C/4.

In some embodiments, the mixing of the electrode material (e.g., the semi-solid cathode or the semi-solid anode) can be performed with, for example, any one of a high shear mixer, a planetary mixer, a centrifugal planetary mixture, a sigma mixture, a CAM mixture and/or a roller mixture. In some embodiments, the mixing of the electrode material can supply a specific mixing energy of at least about 90 J/g, at least about 100 J/g, about 90 J/g to about 150 J/g, or about 100 J/g to about 120 J/g, inclusive of all ranges therebetween.

In some embodiments, the composition of the electrode material and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

In some embodiments, the slurry, or "particle suspension," is initially stabilized by repulsive interparticle steric forces that arise from surfactant molecules. After the particle suspension is loaded into the positive electroactive zone and/or the negative electroactive zone, chemical or heat treatments can cause these surface molecules to collapse or evaporate and promote densification. In some embodiments, the suspension's steric forces are modified intermittently during loading.

For example, the particle suspension can be initially stabilized by repulsive interparticle electrostatic double layer forces to decrease viscosity. The repulsive force reduces interparticle attraction and reduces agglomeration. After the particle suspension is loaded into the positive electroactive zone and/or negative electroactive zone, the surface of the particles can be further modified to reduce interparticle repulsive forces and thereby promote particle attraction and packing. For example, ionic solutions such as salt solutions can be added to the suspension to reduce the repulsive forces and promote aggregation and densification so as to produce increased solids fraction loading after filling of the electroactive zones. In some embodiments, salt is added intermittently during suspension loading to increase density in incremental layers.

In some embodiments, the positive and/or negative electroactive zones are loaded with a particle suspension that is stabilized by repulsive forces between particles induced by an electrostatic double layer or short-range steric forces due to added surfactants or dispersants. Following loading, the particle suspension is aggregated and densified by increasing the salt concentration of the suspension. In some embodiments, the salt that is added is a salt of a working ion for the battery (e.g., a lithium salt for a lithium ion battery) and upon being added, causes the liquid phase to become an ion-conducting electrolyte (e.g., for a lithium rechargeable battery, may be one or more alkyl carbonates, or one or more ionic liquids). Upon increasing the salt concentration, the electrical double layer causing repulsion between the particles is "collapsed," and attractive interactions cause the particle to floc, aggregate, consolidate, or otherwise densify. This allows the electrode of the battery to be formed from the suspension while it has a low viscosity, for example, by pouring, injection, or pumping into the positive and/or negative electroactive zones that can form a net-shaped electrode, and then allows particles within the suspension to be consolidated for improved electrical conduction, higher packing density and longer shelf life.

In some embodiments, the cathode and/or anode semi-solid suspensions can initially be flowable, and can be caused to become non-flowable by "fixing." In some embodiments, fixing can be performed by the action of electrochemically cycling the battery. In some embodiments, electrochemical cycling is performed within the current, voltage, or temperature range over which the battery is subsequently used. In some embodiments, fixing is performed by electrochemical cycling of the battery to a higher or lower current, higher or lower voltage, or higher or lower temperature, than the range over which the battery is subsequently used. In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell formed from the semi-solid cathode and/or the semi-solid anode. In some embodiments, one or more additives are added to the semi-solid suspensions to facilitate fixing.

In some embodiments, the injectable and flowable cathode and/or anode semi-solid is caused to become less flowable or more flowable by "plasticizing." In some embodiments, the rheological properties of the injectable and flowable semi-solid suspensions can be modified by the addition of a thinner, a thickener, and/or a plasticizing agent. In some embodiments, these agents promote processability and help retain compositional uniformity of the semi-solid under flowing conditions and positive and negative electroactive zone filling operations. In some embodiments, one or more additives can be added to the flowable semi-solid suspension to adjust its flow properties to accommodate processing requirements.

Figure 1B:
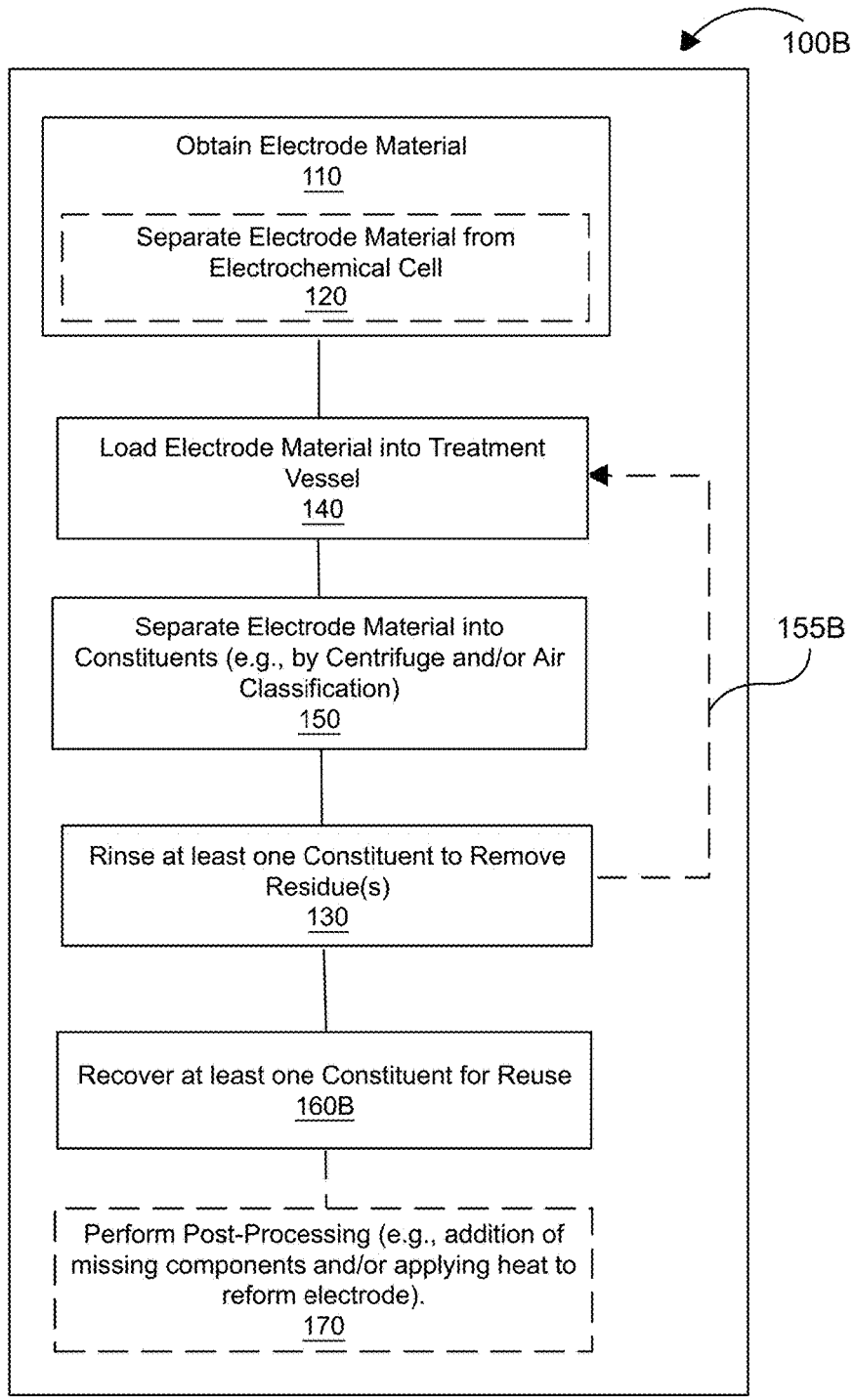
FIG. 1B is a flow diagram showing a process for the remediation/reclamation of an electrode material, according to an embodiment.

FIG. 1B is a flow diagram showing a process 100B for the remediation/reclamation of an electrode material, according to an embodiment. According to process 100B, one or more depleted electrode materials are first obtained, at 110, optionally by separating (at 120) the one or more depleted electrode materials from an electrochemical cell that has reached its "end of service," or that has been at least partially degraded such that its active material is no longer stoichiometric (i.e., there has been a shift in the relative quantities of its constituents). The separation 120 may involve disassembly of the electrochemical cell (the construction of which is discussed in detail above).

Separation of the depleted electrode material (e.g., anode or cathode material(s)) from the electrochemical cell can comprise mechanical removal, for example by scraping, brushing, crumpling of the current collector such that the depleted electrode material flakes off, etc. In some embodiments, the separation of the depleted electrode material from the electrochemical cell does not involve the use of chemicals (i.e., is only mechanical). In some embodiments, the separation of the depleted electrode material from the electrochemical cell comprises the "clean" removal of the electrode material from its respective current collector (i.e., such that little or no damage is done to the current collector, and/or substantially none of the current collector material is present in the separated electrode material). Mechanical separation (i.e., from a current collector) of depleted semi-solid electrode material, in particular, may require only a low applied force to remove.

The depleted electrode material is loaded, at 140, into a treatment vessel. The treatment vessel is selected based on the separation technique that will subsequently be employed at 150. For example, the treatment vessel can comprise, by way of example, a centrifuge vial/tube, a separation chamber of an air classifier machine, a beaker, a tank, or any other suitable vessel. The depleted electrode material is then at least partially separated, at 150, into constituent parts using one or more separation techniques, such as centrifugation, air classification, or any other suitable separation/fractionation technique (e.g., filtration, sieving, sedimentation, field flow fractionation, electrophoresis, and/or the like). In certain embodiments, of the process, constituent materials may be separated on the basis of other physical properties such as magnetic properties, provided there is significant difference in the relevant physical property between the various components.

At least one constituent of the depleted electrode material is then optionally rinsed or washed, at 130, to remove one or more residues, such as electrolyte salt(s). The rinse medium can be any polar organic solvent, such as dimethyl carbonate ("DMC") or any solvent that is miscible with the electrolyte and in which the electrolyte salt(s) is soluble. The rinse can be performed, for example, by immersion of the depleted electrode material in the rinse medium/solvent (e.g., in a jar, beaker, or other suitable container) with or without agitation. In some embodiments, the rinse medium can be recycled or reused during or after the process 100B. In the instance of an electrode material that has a surface reaction product such as SEI, the rinsing or washing procedure can also remove such reaction product. As a non-limiting example, a carbonaceous anode compound after use in a lithium ion battery may possess a surface SEI composed at least in part of lithium carbonate. Said anode may be rinsed in in an acidic aqueous medium to remove said SEI. As a further non-limiting example, there may be surface reaction products formed by the decomposition of electrolyte or other cell components which accumulates on the surface of cathode active materials. These surface layers may be removed by treatment with rinse solvents which preferentially dissolve these surface layers, or by the thermal treatment step, or by both.

Optionally, the process 100B loops (i.e., steps 140, 150, and 130 can be repeated in a loop), at 155B, such that the one or more rinsed constituents (e.g., an active material) resulting from the rinse 130 are again loaded, at 140, into a treatment vessel for a second separation step 150 (which may involve the same separation technique used during the first pass or, alternatively, a different technique (e.g., centrifuge or air classification)). One or more "separate and rinse" loops 155B can be performed as part of process 100B.

At least one constituent (e.g., an active cathode material, an active anode material, a metal or a conductive carbon material) is recovered, at 160B, from the rinse medium for reuse. Post-processing steps can be applied, at 170, to the retrieved constituent material, for example to correct its composition, or to otherwise remediate or reconstitute it. For example, post-processing can include the addition of one or more "missing" components (e.g., a lithium source, such as lithium carbonate, lithium hydroxide, lithium nitrate, lithium sulfate, or any lithium salt, may be added where the initial depleted electrode material is a cathode material) through mixing. In some embodiments, the at least one constituent, optionally combined with any additive or material described herein, is formed or incorporated into a fresh, recycled electrode. The remediation atmosphere can be similar to that used in the original production of the electrode material (i.e., prior to depletion, or in its original manufacture). For example, remediation of metal-oxide cathodes such as LCO, NCM, NCA, LMO, LCP, and LNP can be done in an oxidizing or inert atmosphere, while remediation of metal oxide phosphates such as LFP, LMP and LMFP can be done in an inert or reducing environment. Oxide anodes such as LTO can be remediated by firing in oxidizing ambient, while easily oxidized anodes such as carbon, metal alloys, or silicon may be remediated by heat treating in inert or reducing ambient. One or more heat treatment steps can be performed to the reclaimed electrode material and/or to the recycled electrode, for example to restore crystalline order and/or to densify the reclaimed material. In at least some embodiments, heat treatment is conducted using less thermal energy input than in the original synthesis of the material, for instance by lower temperature and/or time than the original synthesis conditions.

Figure 2:
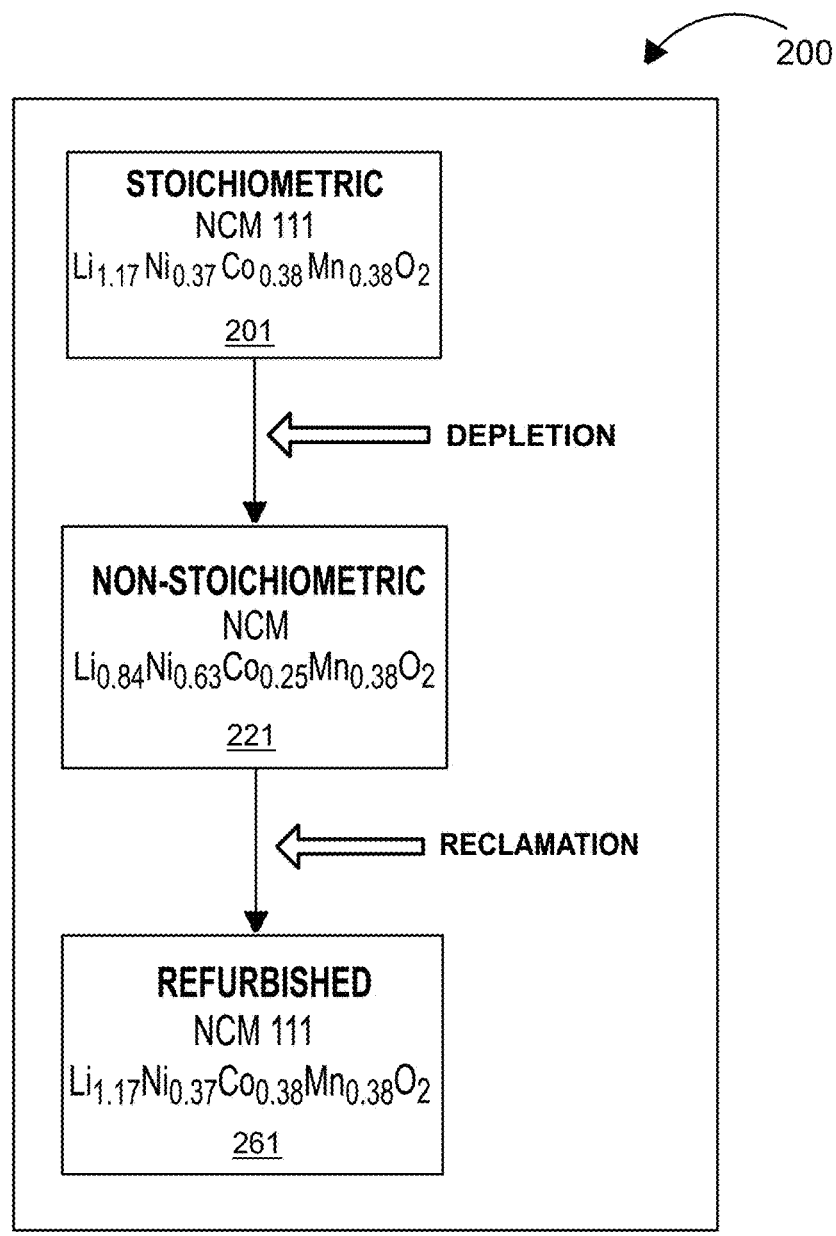
FIG. 2 is a flow diagram showing a compositional evolution of an electrode material, according to an embodiment.

FIG. 2 is a flow diagram showing a compositional evolution of an electrode material, according to an embodiment. As shown, a usage and recycling cycle 200 begins at 201 with a substantially stoichiometric ($Li_{1.17}Ni_{0.37}Co_{0.38}Mn_{0.38}O_2$) NCM 111 cathode that is placed into service (e.g., as part of an electrochemical cell). With time and/or usage, the cathode material becomes depleted, resulting (at 221) in a non-stoichiometric NCM composition (shown, by way of example, as $Li_{0.84}Ni_{0.63}Co_{0.25}Mn_{0.38}O_2$). A reclamation process, such as described above with reference to FIGS. 1A and 1B, is then performed on the non-stoichiometric/depleted NCM cathode material, resulting in a refurbished NCM 111 ($Li_{1.17}Ni_{0.37}Co_{0.38}Mn_{0.38}O_2$) cathode at 261. In some embodiments, the refurbished NCM cathode is substantially stoichiometric. In some embodiments, the refurbished NCM cathode is substoichiometric, but to a lesser degree than prior to reclamation. Many other electrode compositions (e.g., $Li_{1+x}(Ni_{0.5}Co_{0.2}Mn_{0.3})_{1-y}O_2$ ("NCM 523"), $Li_{1+x}(Ni_{0.4}Co_{0.2}Mn_{0.4})_{1-y}O_2$ ("NCM 424"), and any other electrode described herein) can also exhibit compositional changes through use, and can achieve stoichiometric remediation through the reclamation methods set forth herein.

Figure 3:
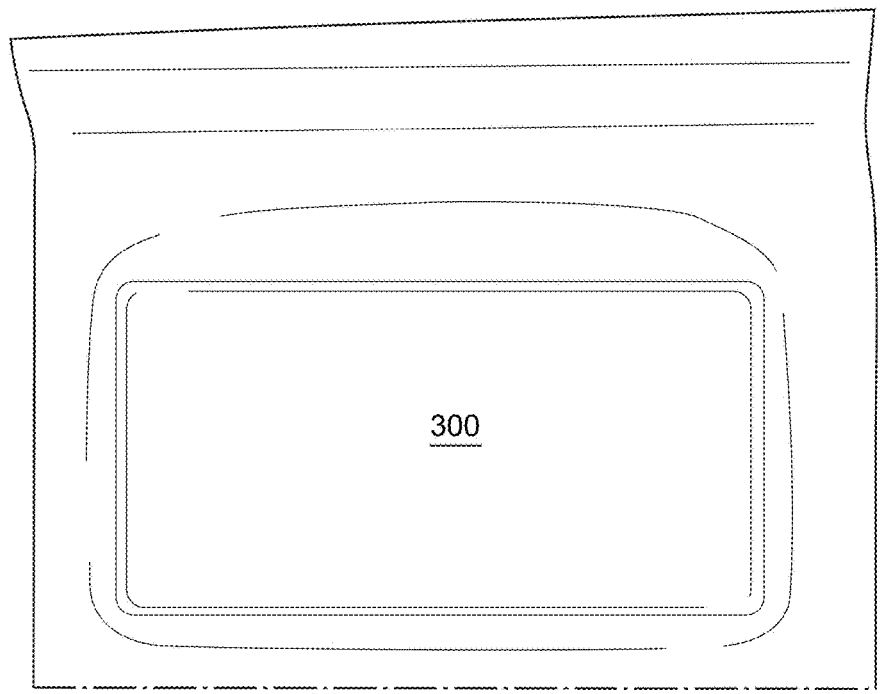
FIG. 3 is a photographic view of a sealed/packaged electrochemical cell, according to an embodiment.

FIG. 3 is a photographic view of a sealed/packaged electrochemical cell prior to disassembly, according to an embodiment.

Figure 4B:
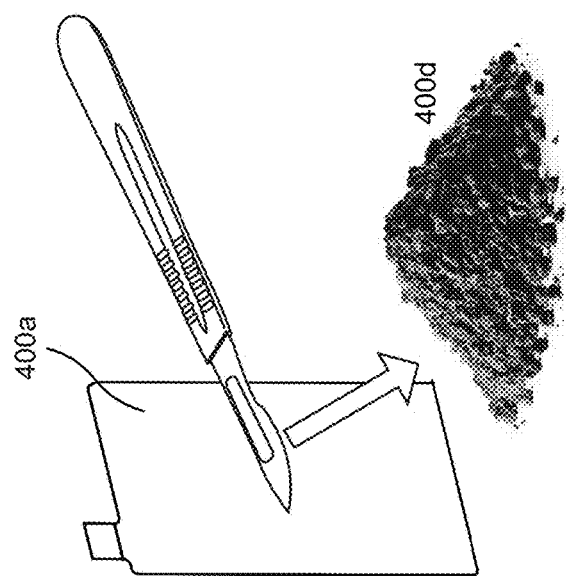
FIG. 4B depicts a mechanical electrode material removal process, according to an embodiment.
Figure 4A:
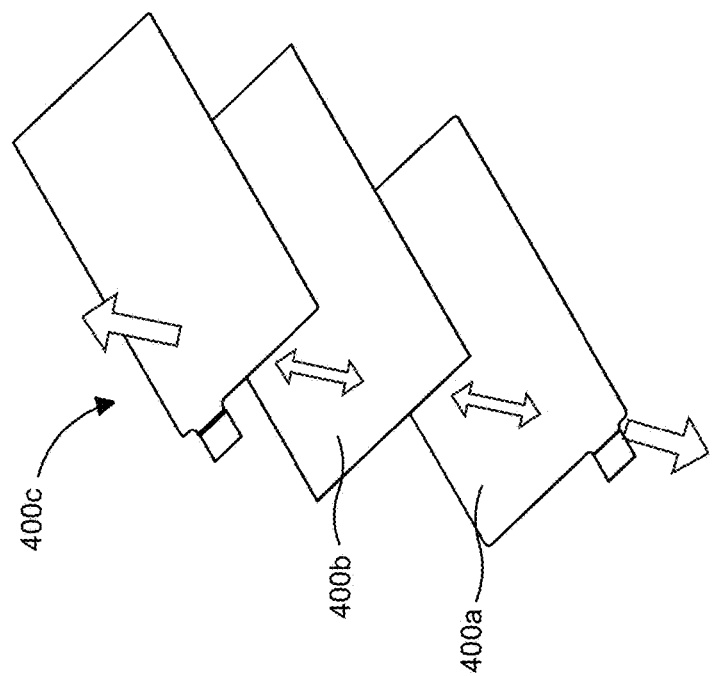
FIG. 4A is a schematic illustration of a disassembled electrochemical cell, according to an embodiment.

FIG. 4A is a schematic illustration of a disassembled electrochemical cell, according to an embodiment. A cathode (e.g., a semi-solid cathode) is disposed on a first surface, proximal to the separator 400b, of the positive current collector 400a. A second surface of the positive current collector 400a distal to the separator 400b is uncoated. Similarly, an anode (e.g., a semi-solid anode) is disposed on a first surface, proximal to the separator 400b, of the negative current collector 400c. A second surface of the negative current collector 400c distal to the separator 400b is uncoated. Said another way, the cathode and the anode are disposed/coated on only one side of the positive current collector 400a and the negative current collector 400c, respectively. While the electrode coatings in this embodiment are on one side only of the respective current collectors, the process is not limited in any such way (e.g., double-sided electrodes can also be remediated according to embodiments described herein). The cathode and the anode can comprise any components (e.g., active materials and/or conductive materials, electrolytes, additives, gel polymers, etc.) as described herein with respect to electrochemical cell construction. FIG. 4B is an illustration of a mechanical electrode material removal process, according to an embodiment. As shown in FIG. 4B, the cathode material that was disposed on the positive current collector 400a has been scraped off the positive current collector 400a using a blade, resulting in the separated depleted electrode material (in this case, cathode material) 400d. FIGS. 5A and 5B are photographic partial views of positive (cathode) and negative (anode) current collectors, respectively, with their respective electrode materials having been physically/mechanically removed, according to an embodiment.

Figure 6:
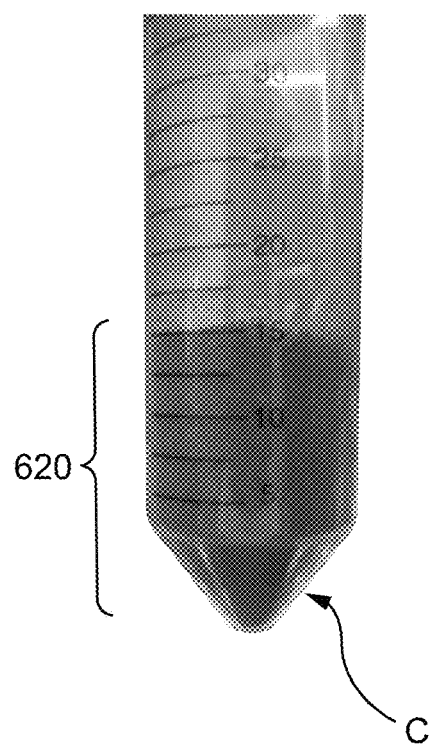
FIG. 6 is a photographic partial view of a centrifuge tube/vial containing a recovered (but not yet centrifuged) cathode material, according to an embodiment.
Figure 7:
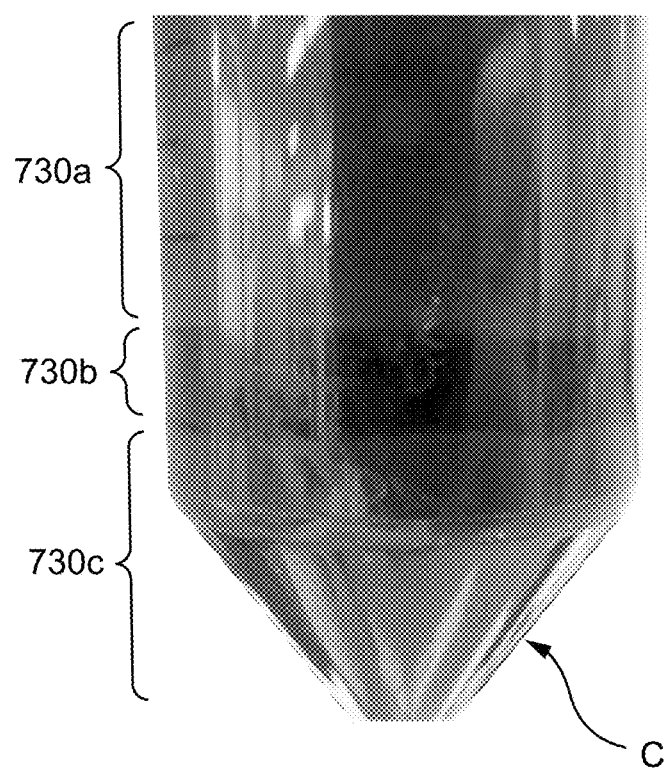
FIG. 7 is a photographic partial view of a centrifuge tube/vial showing a separated/stratified cathode material after centrifugation, according to an embodiment.

FIG. 6 is a photographic partial view of a centrifuge tube/vial containing a recovered (e.g., through mechanical separation from a current collector), but not yet centrifuged, cathode material, according to an embodiment. As shown in FIG. 6, approximately 15 mL (height indicated by 620) of the recovered depleted cathode material which has been loosely broken up and transferred to the centrifuge vial "C." Subsequent to this stage, solvent such as DMC, is added to the centrifuge vial, filling to a total volume of approximately 50 mL. The solvent can be freshly supplied solvent, or can be a solvent that was previously used for rinsing/washing of the depleted cathode material (and, hence, may include one or more dissolved salts and/or other residues), as described herein. The vial is mechanically agitated (shaken) to disperse the solid materials into a dilute slurry and is then centrifuged. FIG. 7 is a photographic partial view of the centrifuge tube/vial of FIG. 6, showing separated/stratified layers formed after centrifugation of the depleted cathode material, according to an embodiment. As shown in FIG. 7, the layers include supernatant 730a (the solvent with dissolved electrolyte salt(s) and/or other residues), conductive carbon 730b, and active material 730c. In some embodiments, the supernatant 730a is then decanted and mixed with a non-polar solvent such as hexane to precipitate the salt for subsequent purification and/or use. In some embodiments, the conductive carbon and/or the active material is removed and either repurposed/reused immediately, or subjected to additional rinse and/or separation steps, as described herein, for example with reference to FIGS. 1A and 1B.

In another embodiment, a similar method is applied to remediate anode active material, such as graphite, from the negative electrode of an electrochemical cell, such as the anode shown (e.g., a semi-solid anode) disposed on a negative current collector 400c in FIG. 4A. As shown in FIG. 5B, the anode material that was disposed on the negative current collector has been scraped off the negative current collector 514 resulting in the recovered 'spent' electrode material (in this case, anode material) 515. This recovered material is then further processed to recover and remediate the active graphite material. In one embodiment, this recovered material, which contains residual electrolyte salt, SEI products, graphite active material, and conductive carbon is transferred to a centrifuge tube. Rinse solution, such as DMC is added and the mixture is mechanically agitated to dissolve the residual electrolyte salt. This slurry is then centrifuged to separate the solids from the supernatant. The supernatant is separated (poured out) and added to a nonpolar liquid, such as hexanes, precipitating out solid electrolyte salt which can optionally be purified. This process of washing may be repeated until all of the electrolyte salt is removed. The remaining solids, now containing only SEI products, graphite active material, and conductive carbon is now treated with an aqueous acid solution, such as 1M hydrochloric acid to dissolve the SEI products. Again, a washing and centrifuging process is used to isolate the graphite active material and conductive carbon, using water as the rinse solution. The material is washed with water and centrifuged repeatedly until the supernatant is substantially neutral (neither acidic nor alkaline). Now, the recovered solids are a mixture of graphite active material and carbon black. This solids mixture is ground to create a free-flowing powder and is separated using an air classifier, which separates the conductive carbon from the graphite active material.

Methods described herein can also be applied to any electrode materials (i.e., non-depleted, stoichiometric, or substantially stoichiometric), such as scrap electrode materials from an electrode manufacturing process. Such scrap materials may not be "depleted," but nevertheless may be subjected to one or more of: rinsing, separation, reconstitution/remediation, heat treatment (e.g., for redensification), etc., such that it can be incorporated into a fresh electrochemical cell.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. Furthermore, one or more steps can be repeated within a given process. The embodiments have been particularly shown and described, but it will be understood that various changes in form and details may be made.

The invention claimed is:

1. A method for electrode remediation, the method comprising:
obtaining a semi-solid electrode material by mechanically separating the semi-solid electrode material from a current collector, the semi-solid electrode material including an active material, a conductive additive, an electrolyte salt, and an electrolyte solvent, and is substantially free of a binder and current collector material after separation;
rinsing the semi-solid electrode material with an organic solvent to remove the electrolyte salt and the electrolyte solvent from the active material and the conductive additive, the organic solvent including at least one of ethylmethyl carbonate, dipropyl carbonate, methyl propyl carbonate, ethyl propyl carbonate, dibutyl carbonate, butylmethyl carbonate, butylethyl carbonate, butylpropyl carbonate, y-butyrolactone, dimethoxyethane, tetrahydrofuran, 2-methyltetrahydrofuran, 4-methyl-1, 3-dioxolane, diethyl ether, sulfolane, methylsulfolane, acetonitrile, propiononitrile, ethyl acetate, methyl propionate, ethyl propionate, teraglyme, and 1,3-dioxolane; and
separating the semi-solid electrode material into a first portion and a second portion, the first portion including the active material and the second portion including the conductive additive using at least one of air classification, field flow fractionation, and electrophoresis.

2. The method of claim 1, wherein the semi-solid electrode material is a semi-solid depleted electrode material.

3. The method of claim 1, wherein the semi-solid electrode material is mechanically separated in the absence of a chemical.

4. The method of claim 1, wherein the semi-solid electrode material is mechanically separated in the absence of chemical dissolution of the semi-solid electrode material.

5. The method of claim 1, wherein obtaining the semi-solid electrode material includes disassembling an electrochemical cell containing the semi-solid electrode material.

6. The method of claim 5, wherein obtaining the semi-solid electrode material includes physically removing the semi-solid electrode material from a portion of the disassembled electrochemical cell.

7. The method of claim 1, the method further comprising:
combining an additive with at least one of the separated constituents of the semi-solid electrode material to alter a stoichiometry and/or a crystallinity thereof; and
heat treating the combined additive and at least one of the separated constituents of the semi-solid electrode material to form a remediated semi-solid electrode material.

8. The method of claim 7, further comprising:
incorporating the remediated semi-solid electrode material into an electrochemical cell.

9. The method of claim 7, wherein the semi-solid electrode material is a cathode material, and the additive is a lithium-containing additive.

10. The method of claim 7, wherein the semi-solid electrode material is a cathode material, and the heat treating is performed in an oxidizing or an inert atmosphere.

11. The method of claim 10, wherein the semi-solid electrode material includes as least one of $LiCoO_2$ ("LCO"), $Li(Ni, Mn, Co)O_2$ ("NMC"), $LiNi_{0.8}Co_{0.15}Al_{0.05}O_2$ ("NCA"), $LiMn_2O_4$ ("LMO"), $LiCoPO_4$ ("LCP"), and $LiNiPO_4$ ("LNP").

12. The method of claim 10, wherein the semi-solid electrode material comprises one of $LiFePO_4$ ("LFP"), $LiMnPO_4$ ("LMP"), $LiMn_{1-x}Fe_xPO_4$ ("LMFP"), and $Li_4Ti_5O_{12}$ ("LTO").

13. The method of claim 7, wherein the semi-solid electrode material is an anode material, and the heat treating is performed in a reducing or an inert atmosphere.

14. The method of claim 1, wherein separating the semi-solid electrode material into constituents includes using air classification and results in a sedimentation of the constituents into layers.

15. The method of claim 1, further comprising:
loading the semi-solid electrode material into a treatment vessel.

16. The method of claim 1, wherein rinsing includes immersing the semi-solid electrode material in the organic solvent.

17. The method of claim 1, wherein the semi-solid electrode material is rinsed prior to separating the electrode material into constituents.

18. The method of claim 1, wherein the semi-solid electrode material is separated prior to rinsing.

19. The method of claim 1, wherein the rinsing is a first rinsing and the separating is a first separating, the method further comprising a second rinsing and a second separating.

20. A method for recycling a binderless electrode material, the method comprising:
mechanically separating the binderless electrode material from a current collector in the absence of a chemical and with substantially no current collector material present in the binderless electrode material after separation;
rinsing the binderless electrode material with an organic solvent to remove a residue, the organic solvent including at least one of ethylmethyl carbonate, dipropyl carbonate, methyl propyl carbonate, ethyl propyl carbonate, dibutyl carbonate, butylmethyl carbonate, butylethyl carbonate, butylpropyl carbonate, y-butyrolactone, dimethoxyethane, tetrahydrofuran, 2-methyltetrahydrofuran, 4-methyl-1,3-dioxolane, diethyl ether, sulfolane, methylsulfolane, acetonitrile, propiononitrile, ethyl acetate, methyl propionate, ethyl propionate, teraglyme, and 1,3-dioxolane; and
separating the binderless electrode material into a first portion and a second portion, the first portion including the active material and the second portion including the conductive additive using at least one of air classification, field flow fractionation, and electrophoresis.

21. The method of claim 20, further comprising:
combining an additive with at least one of the separated constituents to alter a stoichiometry and/or a crystallinity thereof.

22. The method of claim 21, wherein the binderless electrode material is a cathode material, and the additive is a lithium-containing additive.

23. The method of claim 21, further comprising:
heating the additive and at least one of the separated constituents to produce a remediated binderless electrode material.

24. The method of claim 20, wherein separating the binderless electrode material from the current collector includes using at least one of a centrifuge, air classification, filtration, sieving, sedimentation, field flow fractionation, and electrophoresis.

25. The method of claim 20, wherein rinsing the binderless electrode material includes immersing at least a portion of the binderless electrode material in the organic solvent.

26. The method of claim 20, wherein the residue includes at least a portion of an electrolyte salt, an electrolyte solvent, and a reaction product, including a solid electrolyte interphase material.

27. A method for recycling an electrode material, the method comprising:
obtaining the electrode material by separating the electrode material from at least one of a current collector and a separator in the absence of heat and a chemical, the electrode material being substantially free of a binder and current collector material after separation;
rinsing the electrode material with an organic solvent to remove at least a portion of an electrolyte salt, an electrolyte solvent, and a reaction product, the organic solvent including at least one of ethylmethyl carbonate, dipropyl carbonate, methyl propyl carbonate, ethyl propyl carbonate, dibutyl carbonate, butylmethyl carbonate, butylethyl carbonate, butylpropyl carbonate, y-butyrolactone, dimethoxyethane, tetrahydrofuran, 2-methyltetrahydrofuran, 4-methyl-1,3-dioxolane, diethyl ether, sulfolane, methyl sulfolane, acetonitrile, propiononitrile, ethyl acetate, methyl propionate, ethyl propionate, teraglyme, and 1,3-dioxolane; and
separating the electrode material into a first portion and a second portion, the first portion including active electrode material and the second portion including a conductive carbon material using at least one of air classification, field flow fractionation, and electrophoresis.

28. The method of claim 27, further comprising:
separating the electrode material into a third portion, the third portion including a metal.

29. The method of claim 27, wherein the reaction product is a solid electrolyte interphase material.

* * * * *